US009600147B2

(12) United States Patent
Park-Ekecs et al.

(10) Patent No.: US 9,600,147 B2
(45) Date of Patent: Mar. 21, 2017

(54) MULTI-LAYER USER INTERFACES

(71) Applicant: DISNEY ENTERPRISES, INC., Burbank, CA (US)

(72) Inventors: Sylvia Park-Ekecs, Newbury Park, CA (US); Keith Tralins, Sherman Oaks, CA (US); Richard Cardran, Los Angeles, CA (US); Tiffany R. Smith, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 221 days.

(21) Appl. No.: 14/023,414

(22) Filed: Sep. 10, 2013

(65) Prior Publication Data
US 2014/0215408 A1 Jul. 31, 2014

Related U.S. Application Data

(60) Provisional application No. 61/759,343, filed on Jan. 31, 2013.

(51) Int. Cl.
*G06F 3/048* (2013.01)
*G06F 3/0483* (2013.01)
*G06F 9/44* (2006.01)

(52) U.S. Cl.
CPC ............ *G06F 3/0483* (2013.01); *G06F 3/048* (2013.01); *G06F 9/4443* (2013.01)

(58) Field of Classification Search
CPC ....... G06F 3/048; G06F 3/0483; G06F 9/4443
USPC ....................................................... 715/854
See application file for complete search history.

(56) References Cited

U.S. PATENT DOCUMENTS

| 5,651,107 | A | * | 7/1997 | Frank | G06F 3/0481 |
| | | | | | 345/589 |
| 2007/0271532 | A1 | * | 11/2007 | Nguyen et al. | 715/854 |
| 2008/0163090 | A1 | * | 7/2008 | Cortright | G06F 3/0481 |
| | | | | | 715/771 |
| 2009/0007017 | A1 | * | 1/2009 | Anzures et al. | 715/835 |
| 2010/0070889 | A1 | * | 3/2010 | Weisbart | G06F 17/30899 |
| | | | | | 715/760 |
| 2010/0115051 | A1 | | 5/2010 | Robert et al. | |
| 2010/0277337 | A1 | * | 11/2010 | Brodersen et al. | 340/825.22 |
| 2011/0202877 | A1 | * | 8/2011 | Lassonde | G06F 3/0482 |
| | | | | | 715/817 |
| 2013/0054652 | A1 | * | 2/2013 | Antonelli et al. | 707/797 |
| 2014/0082541 | A1 | * | 3/2014 | Olausson | G05B 23/0267 |
| | | | | | 715/771 |

* cited by examiner

Primary Examiner — William Bashore
Assistant Examiner — Gregory A Distefano
(74) Attorney, Agent, or Firm — Sheppard, Mullin, Richter & Hampton LLP

(57) ABSTRACT

Multi-layer user interfaces are provided. A user may traverse a hierarchy of information by accessing information in different branches of the hierarchy without having to traverse back up the current branch to access the new branch. A multi-layer user interface (UI) may comprise a set of UIs, each of which corresponds to a navigation layer and a level of the hierarchy. Each UI may comprise a set of UI controls that allow the user to traverse within a level or to a different level of the hierarchy. The UI controls may be configured such that a visual clue as a breadcrumb and user path history may also be provided.

16 Claims, 3 Drawing Sheets

MULTI-LAYER USER INTERFACES

CROSS-REFERENCE TO RELATED APPLICATIONS

This application claims the benefit of U.S. Provisional Application No. 61/759,343, filed on Jan. 31, 2013, which is hereby incorporated herein by reference in its entirety.

TECHNICAL FIELD

The present application relates generally to graphical user interfaces, and more particularly, some embodiments relate to multi-layer graphical user interfaces for browsing hierarchical information.

DESCRIPTION OF THE RELATED ART

Electronic visual displays are ubiquitous and affecting people's lives significantly. Via user interfaces, a user interacts with electronic visual displays to select information of interest to be displayed. Much of today's media content uses a hierarchical structure for storing and organizing content. Typically, a higher-level asset is used as a mechanism to allow the user to access lower-level content regardless of the platform. However, if a user wishes to access lower-level content related to a different subject or topic, the user is required to traverse back up the hierarchy until the topic selections are available, and then traverse down through the hierarchy of the newly selected topic.

BRIEF SUMMARY OF THE APPLICATION

Multi-layer user interfaces are provided. Systems and methods described herein provide a user with the option to traverse a hierarchy (virtual or otherwise) of information, accessing information in different branches of the hierarchy without having to traverse back up the current branch to access the new branch. In various embodiments, a multi-layer user interface (UI) comprises a set of UIs wherein each UI corresponds to a navigation layer and a level of the hierarchy. Each UI of a multi-layer UI may comprise a set of UI controls, allowing a user to traverse within a level or to a different level of the hierarchy. The UI controls may be configured such that a visual clue as a breadcrumb and user path history may also be provided.

BRIEF DESCRIPTION OF THE DRAWINGS

The figures are provided for purposes of illustration only and merely depict typical or example embodiments. They do not limit the breadth, scope, or applicability of the invention.

DETAILED DESCRIPTION OF THE EMBODIMENTS OF THE APPLICATION

Consider the example of theatrical events. In the case of information regarding movies, a higher-level asset may include information about a plurality of different movies (e.g., poster arts of different movies). The user may select a particular movie and be brought to the next level or layer. When at the next level or layer, the user may be presented with desired information and may also be given with options to select information of another level. In this example, other levels of information may include content such as, for example, trailers, movie details, casting, information, synopses, and show times, etc. Each of these additional content items may be contained in yet another level or layer. Accordingly, the user may continue to drill down the multiple layers of information accessing more details as he or she progresses.

Figure 1:
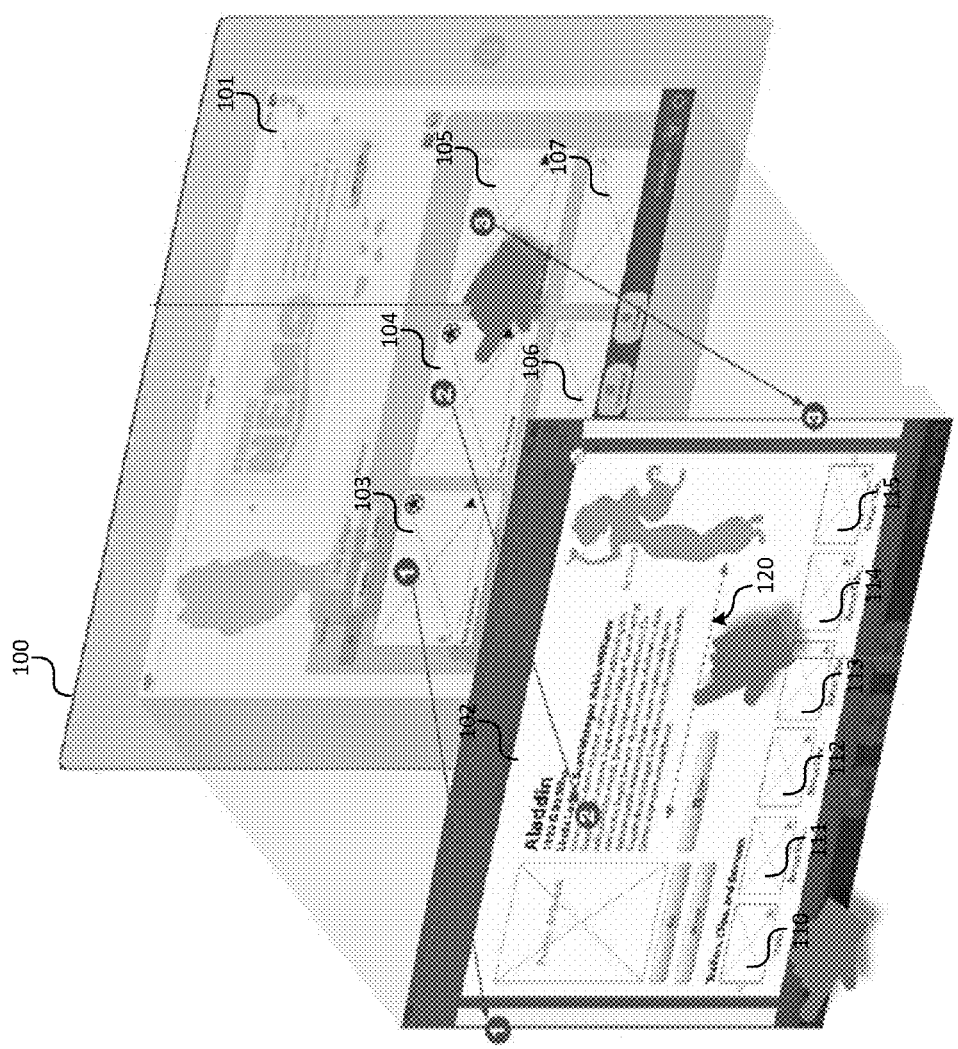
FIG. 1 illustrates an example multi-layer user interface (UI) in accordance with one embodiment described herein.

FIG. 1 is a diagram illustrating an example multi-layer user interface (UI) for accessing information at multiple levels in accordance with one embodiment of the systems and methods described herein. In the illustrated example, the multi-layer UI is displayed using an electronic display device 100. The example multi-layer UI comprises a higher-level (Layer 1) UI and a lower-level (Layer 2) UI. A layer UI refers to the navigation level for the UI flow. Each layer UI may comprise a set of UI controls and correspond to a set of corresponding UI screens for illustrating different information. A UI screen refers to the UI schematic.

As illustrated, the buttons 103-107 on the Layer 1 UI screen 101 represent the set of UI controls 103-107 of the Layer 1 UI. Each of the UI controls 103-107 may allow a user to select information of another different level. UI controls may include screen buttons of various shapes and appearances. Examples of UI controls are buttons 103-107 that may be tapped or clicked by the user to access another level of information or to access another layer UI. A UI may also include traditional navigation elements such as, for example scroll left/right, scroll up/down, back, zoom in/out, double click, multi-touch, and so on.

The example multi-layer UI also comprises a lower-level, or next-level, (Layer 2) UI. The Layer 2 UI screen 102 shows information requested by the user. In the illustrated example, the Layer 2 UI screen 102 shows information corresponding to a UI control (e.g., one of the UI controls 103-107) actuated by the user at the previous layer (i.e., the Layer 1 UI). For example, when the user selects a Poster Art button 104 on the Layer 1 UI screen 101, the user is brought to the poster art screen (i.e., the Layer 2 UI screen 102), where the selected poster art is displayed along with any relevant information. In the illustrated example, this is shown by the line bracketed by the two numbers "2" running from the Layer 1 UI screen 101 to the Layer 2 UI screen 102. In some embodiments, this may be implemented with metadata. For example, when a user selects an interface control having associated metadata on one layer UI, the user is brought to the next layer UI as dictated by the associated metadata.

As shown in this example, the Layer 2 UI may also include UI controls 110-115 illustrated by the buttons 110-115 on the Layer 2 UI screen 102. The Layer 2 UI controls 110-115 may allow a user to select information contained at various levels or to access UIs of different layers. As is the case with UIs of other layers, UI controls may include screen buttons of various shapes and appearances. Examples of UI controls are buttons 110-115 that may be tapped or clicked by the user to access another layer of information. Any UI may also include traditional navigation elements such as, for example scroll left/right, scroll up/down, back, zoom in/out, double click, multi-touch, and so on.

In further embodiments, a back UI control and other UI controls may be provided. In the illustrated example, selecting any area outside of the current layer UI screen (e.g., the Layer 2 UI screen 102) may close the current layer UI screen and return the user to the previous layer UI screen (e.g., the Layer 1 UI screen 101). As such, the user returns from the present UI navigation layer to a previous UI navigation layer. A visual clue as a breadcrumb and user path history may also be provided. In some embodiments, scrolling up and down may allow the user to view the path history. In various embodiments, when a multilayer user interface is used, it may retain the content order from a higher-level layer (e.g., Layer 1) to a lower-level layer (e.g., Layer 2). In other words, content of a lower level (e.g., the detailed information, metadata) may be provided to the user according to the order of a higher level (e.g., the topic or subject). As such, the multi-layer UI is continuous across all layers of UIs.

In various embodiments, a user is permitted to traverse the navigation layer corresponding to the Layer 2 UI and obtain content regarding other topics without first traversing back to (or up the branch to) the previous Level 1 UI navigation layer. The Layer 2 UI may comprise UI controls such as the swiping horizontally 120 relevant to the electronic display device 100, which allows the user to browse information of the Layer 2 UI navigation layer but related to different topics or subjects. For example, on the Layer 2 UI, the user may swipe (e.g., horizontally, vertically, or in other directions) to navigate from one topic to the next within a layer (Layer 2). As further example, on the Layer 2 UI, swiping right would allow the user to access information that may be actuated by the UI control 105 without having to first navigate back to the Layer 1 UI to actuate the UI control 105. Likewise, on the Layer 2 UI, swiping left in this example would allow the user to access information that may be actuated by the UI control 103 without having to first navigate back to the Layer 1 UI to actuate the UI control 103.

UI controls included in each layer of various multi-layer UIs are not limited to swiping left or right by one screen only; each layer UI may allow browsing 'horizontally' or 'vertically' in this fashion across multiple different screens in a given layer. Therefore, swiping left or right on the Layer 2 UI in this example, may allow the user to access the Movie Poster details screen for different movies.

Additional layers may be accessed in a similar fashion. For example, selecting a UI control of the UI controls 110-115 navigates the user to a corresponding layer UI (e.g., Layer 3). The UI may also include detailed information, UI controls including navigation controls. A multi-layer UI system may be configured to provide a number of layers necessary to accommodate the number of levels in a hierarchy.

In some embodiments, a UI screen of a different layer may pop up as a new window on an electronic display device 100. In further embodiments, a UI is configured such that the user may still see the previous UI screen (e.g., an upper layer UI screen) below the current UI screen. That is, in some embodiments, the current UI screen (e.g., a lower layer UI screen) is rendered semi-transparent. As illustrated, the Layer 1 UI screen 101 may still be seen through the Layer 2 UI 102.

Figure 2:
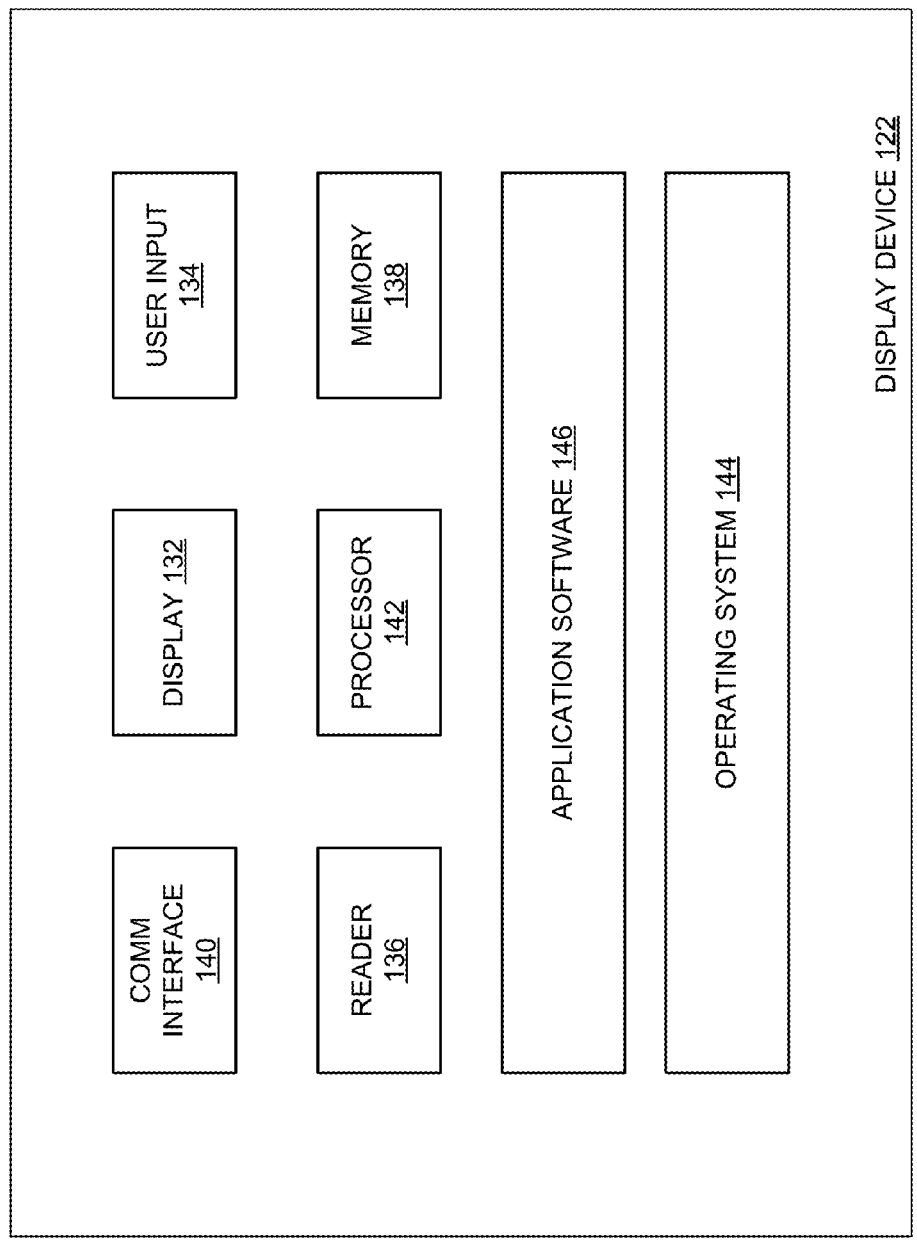
FIG. 2 illustrates a detailed view of one example of an exemplary display device with which the UI of FIG. 1 can be used.

Turning now to FIG. 2, a detailed view of one example of an exemplary display device 122 with which the UI of FIG. 1 can be used is provided. The display devices 122 may take various forms, including, for example, iPads®, tablet computers, iPhones®, Kindles®, Android® devices, or other like tablets, smart phones, smart TVs or other computing devices. Accordingly, the display device 122 may include operating system software 144. The operating system software 144 may be a conventional operating system such as Windows®, MacOS®, Linux®, or others; it may be a stripped down version of an operating environment such as a Java Virtual Machine or the like; or it may be a mobile operating system such as the Android® Operating System from Google®, the iOS from Apple®, the Windows Phone® from Microsoft® or other mobile operating system. The operating system software 144 may include software routines that allow for the hosting and execution of one or more application programs or application software 146 such as event applications.

The application software 146 may include software that provides additional functionality to the device. In some embodiments, the application software 146 may include applications to provide browsing and navigation features such as those described herein. As described herein, the application software 146 may be downloaded to the device such as via a communication interface 140 (described below) or it may be preinstalled in memory 138 of the display device 122.

As shown, the example display device 122 includes a display 132. The display 132 may form part of the display device 122, or it may be a separate hardware component that is connected to the display device 122. For example, the display 132 may be a touch screen display, which is part of the iPad® device and/or a smart TV.

The example display device 122 also includes a processor 142 and memory 138. The memory 138 may include volatile memory such as some form of random access memory, and it may include non-volatile memory such as flash memory or a hard disk drive. The processor 142 may be a conventional central processing unit (CPU) such as those manufactured by AMD®, and Intel®, or it may be a specialized processor. The processor 142 may be configured to execute computer instructions from the operating system software 144, application software 146, or other software stored in the memory 138.

The display device 122 may also include a communication interface 140. The communication interface 140 may take the form of a network interface chip or card and its corresponding driver software that allows the display device 122 to communicate with external networks. For example, the communication interface 140 can include communication interfaces to support communication protocols such as Bluetooth®, WiFi® or other wireless or wired protocols. The display device 122 may further include a card reader or other memory device reader 136 capable of reading removable memory cards such as, for example, SD cards, thumb drives and the like.

Figure 3:
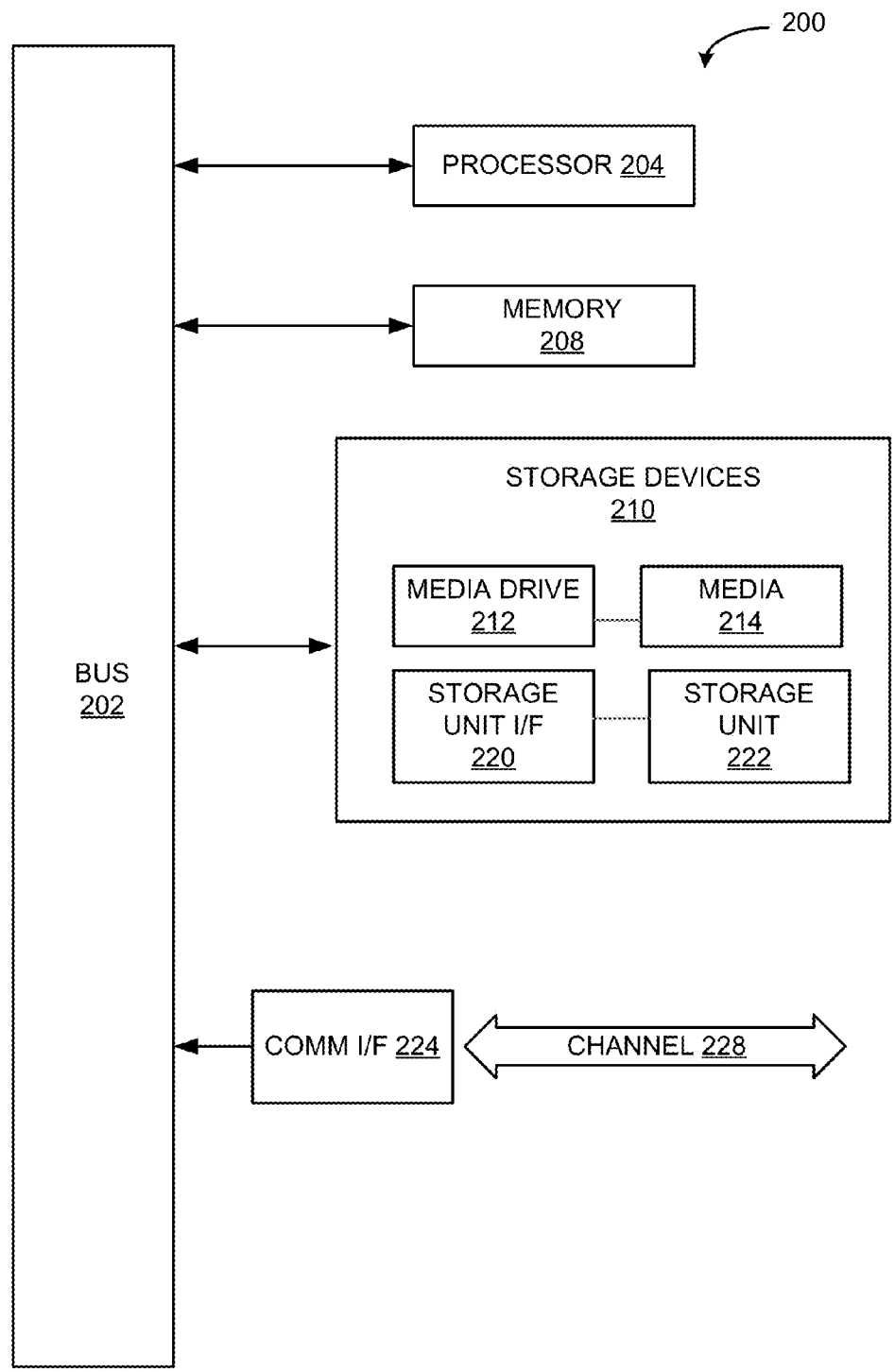
FIG. 3 illustrates an example computing module that may be used to implement various features of the system and methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 3. Various embodiments are described in terms of this example-computing module 200. After reading this description, it will become apparent to a person skilled in the relevant art how to implement the application using other computing modules or architectures.

Referring now to FIG. 3, the computing module 200 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. The computing module 200 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

The computing module 200 might include, for example, one or more processors, controllers, control modules, or other processing devices, such as a processor 204. The processor 204 might be implemented using a general-purpose or special-purpose processing engine such as, for example, a microprocessor, controller, or other control logic. In the illustrated example, the processor 204 is connected to a bus 202, although any communication medium can be used to facilitate interaction with other components of the computing module 200 or to communicate externally.

The computing module 200 might also include one or more memory modules, simply referred to herein as main memory 208. For example, preferably random access memory (RAM) or other dynamic memory, might be used for storing information and instructions to be executed by the processor 204. The main memory 208 might also be used for storing temporary variables or other intermediate information during execution of instructions to be executed by the processor 204. The computing module 200 might likewise include a read only memory ("ROM") or other static storage device coupled to the bus 202 for storing static information and instructions for the processor 204.

The computing module 200 might also include one or more various forms of information storage mechanism 210, which might include, for example, a media drive 212 and a storage unit interface 220. The media drive 212 might include a drive or other mechanism to support fixed or removable storage media 214. For example, a hard disk drive, a floppy disk drive, a magnetic tape drive, an optical disk drive, a CD or DVD drive (R or RW), or other removable or fixed media drive might be provided. Accordingly, storage media 214 might include, for example, a hard disk, a floppy disk, magnetic tape, cartridge, optical disk, a CD or DVD, or other fixed or removable medium that is read by, written to or accessed by the media drive 212. As these examples illustrate, the storage media 214 can include a computer usable storage medium having stored therein computer software or data.

In alternative embodiments, the information storage mechanism 210 might include other similar instrumentalities for allowing computer programs or other instructions or data to be loaded into the computing module 200. Such instrumentalities might include, for example, a fixed or removable storage unit 222 and an interface 220. Examples of such storage units 222 and interfaces 220 can include a program cartridge and cartridge interface, a removable memory (for example, a flash memory or other removable memory module) and memory slot, a PCMCIA slot and card, and other fixed or removable storage units 222 and interfaces 220 that allow software and data to be transferred from the storage unit 222 to the computing module 200.

The computing module 200 might also include a communications interface 224. The communications interface 224 might be used to allow software and data to be transferred between the computing module 200 and external devices. Examples of communications interface 224 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via the communications interface 224 might typically be carried on signals, which can be electronic, electromagnetic (which includes optical) or other signals capable of being exchanged by a given communications interface 224. These signals might be provided to the communications interface 224 via a channel 228. This channel 228 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, the memory 208, the storage unit interface 220, the media 214, and the channel 228. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 200 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A system for browsing a hierarchy of information on a display, comprising: a display comprising a display area; a processor; and a non-transitory computer-readable medium operatively coupled to the processor and having instructions stored thereon that, when executed by the processor, causes the system to: display on all of the display area a first user interface screen, the first user interface corresponding to a first level of the hierarchy and comprising a set of first user interface controls for selecting information of the first level of the hierarchy that is associated with each of a plurality of content items; receive data generated by a user selecting information associated with a first of the plurality of content items while the first user interface screen is displayed; in response to receiving the data, display on all of the display area a second user interface screen that includes additional information associated with the first of the plurality of content items, the second user interface corresponding to a second level of the hierarchy and comprising a set of second user interface controls for navigating information of the second level of the hierarchy associated with each of the plurality of content items without navigating back to the first user interface; wherein the second user interface screen is semitransparent such that the first user interface screen is seen through the second user interface screen.

2. The system of claim 1, wherein one of the set of first user interface controls actuates the second user interface.

3. The system of claim 1, wherein the display is a touchscreen display, and wherein the instructions, when executed by the processor, further cause the system to: receive second data generated by a user by swiping an area of the touchscreen display in a direction when the second user interface screen is displayed; and in response to receiving the second data, display on the second user interface screen additional information associated with a second of the plurality of content items.

4. The system of claim 3, wherein the second user interface retains a content order for navigating the plurality of content items that is used in the first user interface for navigating the plurality of content items.

5. The system of claim 1, wherein the second user interface is configured such that a user selection outside the second user interface screen returns to the first user interface screen.

6. The system of claim 1, wherein the instructions, when executed by the processor, further cause the system to: receive second data generated by a user by actuating the set of second user interface controls; and in response to receiving the second data, display on the display area a third user interface screen without navigating back to the first user interface screen, the third user interface corresponding to a third level of the hierarchy.

7. The system of claim 1, wherein the set of first user interface controls comprises metadata of the first level of the hierarchy.

8. The system of claim 1, wherein the set of the first user interface controls and the set of the second user interface controls are configured such that a user swipe input on the second user interface screen returns the second user interface screen to the first user interface screen, and wherein a user swipe input on the first user interface screen returns the first user interface screen to a previous user interface screen.

9. A graphical user interface method for browsing a hierarchy of information on a digital display, comprising: displaying on all of a display area of the digital display a first user interface screen, the first user interface corresponding to a first level of the hierarchy and comprising a set of first user interface controls for selecting information of the first level of the hierarchy that is associated with each of a plurality of content items; receiving data generated by a user selecting information associated with a first of the plurality of content items while the first user interface screen is displayed; and in response to receiving the data, displaying on all of the display area a second user interface screen that includes additional information associated with the first of the plurality of content items, the second user interface corresponding to a second level of the hierarchy and comprising a set of second user interface controls for navigating information of the second level of the hierarchy associated with each of the plurality of content items without navigating back to the first user interface; wherein the second user interface screen is semitransparent such that the first user interface screen is seen through the second user interface screen.

10. The graphical user interface method of claim 9, wherein one of the set of first user interface controls actuates the second user interface.

11. The graphical user interface method of claim 9, wherein the digital display is a touchscreen display, and further comprising: receiving second data generated by a user by swiping an area of the touchscreen display in a direction when the second user interface screen is displayed; and in response to receiving the second data, displaying on the second user interface screen additional information associated with a second of the plurality of content items.

12. The graphical user interface method of claim 11, wherein the second user interface retains a content order for navigating the plurality of content items that is used in the first user interface for navigating the plurality of content items.

13. The graphical user interface method of claim 9, wherein the second user interface is configured such that a selection outside the second user interface screen returns to the first user interface screen.

14. The graphical user interface method of claim 9, further comprising: receiving second data generated by a user by actuating the set of second user interface controls; and in response to receiving the second data, display on the display area a third user interface screen without navigating back to the first user interface screen, the third user interface corresponding to a third level of the hierarchy.

15. The graphical user interface method of claim 9, wherein the set of first user interface controls comprises metadata of the first level of the hierarchy.

16. The graphical user interface method of claim 9, wherein the set of the first user interface controls and the set of the second user interface controls are configured such that a user swipe input on the second user interface screen returns the second user interface screen to the first user interface screen, and wherein a user swipe input on the first user interface screen returns the first user interface screen to a previous user interface screen.

* * * * *